United States Patent
Veerasamy et al.

(10) Patent No.: US 9,904,431 B2
(45) Date of Patent: *Feb. 27, 2018

(54) CAPACITANCE TOUCH PANEL WITH SILVER-INCLUSIVE TRANSPARENT CONDUCTIVE LAYER(S) AND DIELECTRIC LAYER(S)

(71) Applicant: GUARDIAN GLASS, LLC, Auburn Hills, MI (US)

(72) Inventors: Vijayen S. Veerasamy, Ann Arbor, MI (US); Jason Blush, Milford, MI (US); Eric W. Akkashian, Waterford, MI (US); Willem Den Boer, Brighton, MI (US); Alexey Krasnov, Canton, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,541

(22) Filed: Jul. 12, 2017

(65) Prior Publication Data

US 2017/0315637 A1    Nov. 2, 2017

Related U.S. Application Data

(63) Continuation of application No. 15/215,908, filed on Jul. 21, 2016, now Pat. No. 9,733,779, which is a (Continued)

(51) Int. Cl.
G06F 3/044    (2006.01)
G02F 1/1333   (2006.01)
G06F 3/041    (2006.01)

(52) U.S. Cl.
CPC .......... *G06F 3/044* (2013.01); *G02F 1/13338* (2013.01); *G06F 3/0412* (2013.01); *G06F 2203/04103* (2013.01)

(58) Field of Classification Search
CPC ................. G06F 3/041; G06F 3/044
See application file for complete search history.

(56) References Cited

U.S. PATENT DOCUMENTS 5,254,413 A   10/1993  Maricocchi
8,124,237 B2  2/2012   Nunez-Regueiro et al.
(Continued)

FOREIGN PATENT DOCUMENTS

JP   2010-157239   7/2010
JP   2012-133779   7/2012
(Continued)

OTHER PUBLICATIONS

U.S. Appl. No. 15/215,908, filed Jul. 21, 2016; Veerasamy et al.
(Continued)

*Primary Examiner* — Alexander Eisen
*Assistant Examiner* — Cory Almeida
(74) *Attorney, Agent, or Firm* — Nixon & Vanderhye P.C.

(57) ABSTRACT

Certain example embodiments relate to capacitive touch panels. First and second glass substrates are substantially parallel and spaced apart from one another. At least one multi-layer transparent conductive coating (TCC) is patterned into electrodes and located between the first and second substrates. The TCC(s) include(s) at least one conductive layer including silver, a dielectric layer including zinc oxide under and directly contacting the conductive layer including silver, and a dielectric layer(s) including tin oxide or silicon nitride over the conductive layer including silver. Processing circuitry electrically connects to the electrodes and measures an aspect of the electrodes' capacitance. A laminate material is located between the first and second glass substrates. The TCC(s), when blanket deposited, may have a visible transmission of at least 88%, a sheet resistances of no more than 10 ohms per square, and a haze of no
(Continued)

more than 0.5%. Mutual and self-capacitance designs are disclosed.

13 Claims, 10 Drawing Sheets

Related U.S. Application Data continuation-in-part of application No. 15/146,270, filed on May 4, 2016, now Pat. No. 9,740,357, which is a continuation of application No. 13/685,871, filed on Nov. 27, 2012, now Pat. No. 9,354,755.

(56) References Cited

U.S. PATENT DOCUMENTS

| | | | |
|---|---|---|---|
| 8,138,425 | B2 | 3/2012 | Lee et al. |
| 8,173,263 | B2 | 5/2012 | Lingle et al. |
| 8,187,713 | B2 | 5/2012 | Lemmer et al. |
| 8,202,619 | B2 | 6/2012 | Thomsen et al. |
| 8,203,073 | B2 | 6/2012 | Lu et al. |
| 8,263,227 | B2 | 9/2012 | Disteldorf et al. |
| 8,293,344 | B2 | 10/2012 | Lemmer et al. |
| 8,313,620 | B2 | 11/2012 | Krasnov |
| 9,354,755 | B2 | 5/2016 | Den Boer et al. |
| 9,733,779 | B2 | 8/2017 | Veerasamy et al. |
| 2004/0086723 | A1* | 5/2004 | Thomsen ............. C03C 17/36 428/426 |
| 2009/0314621 | A1* | 12/2009 | Hotelling ............ G06F 3/0416 200/600 |
| 2010/0013784 | A1 | 1/2010 | Nashiki et al. |
| 2010/0046191 | A1 | 2/2010 | Den Boer et al. |
| 2010/0128001 | A1 | 5/2010 | Kimura et al. |
| 2010/0163994 | A1 | 7/2010 | Tang et al. |
| 2010/0209729 | A1 | 8/2010 | Thomsen et al. |
| 2011/0193799 | A1 | 8/2011 | Jun et al. |
| 2012/0114919 | A1 | 5/2012 | Nakajima et al. |
| 2012/0118614 | A1 | 5/2012 | Kuriki |
| 2012/0219821 | A1 | 8/2012 | Frank et al. |
| 2012/0227259 | A1* | 9/2012 | Badaye ............... G06F 3/044 29/846 |
| 2014/0145999 | A1 | 5/2014 | Den Boer et al. |
| 2015/0036066 | A1 | 2/2015 | Chan et al. |
| 2016/0190055 | A1 | 6/2016 | Jinbo et al. |

FOREIGN PATENT DOCUMENTS

| | | |
|---|---|---|
| RU | 2385835 | 4/2010 |
| RU | 2009138474 | 4/2011 |
| WO | WO 2012/099253 | 7/2012 |
| WO | WO 2012/099394 | 7/2012 |
| WO | WO 2012/128893 | 9/2012 |

OTHER PUBLICATIONS

U.S. Appl. No. 15/146,270, filed May 4, 2016, Den Boer et al.
Geoff Walker, "Part 1: Fundamentals of Projected-Capacitive Touch Technology," Intel Corporation, SID Display Week '14 v1.2, Jun. 1, 2014, 315 pages.
Search Report and Office Action for RU Application No. 2015125572 dated Nov. 15, 2017.

* cited by examiner

_US 9,904,431 B2_

CAPACITANCE TOUCH PANEL WITH SILVER-INCLUSIVE TRANSPARENT CONDUCTIVE LAYER(S) AND DIELECTRIC LAYER(S)

CROSS-REFERENCE TO RELATED APPLICATION

This application is a continuation of U.S. application Ser. No. 15/215,908 filed Jul. 21, 2016, which is a continuation-in-part(CIP) of U.S. application Ser. No. 15/146,270 filed on May. 4, 2016, which is a continuation of U.S. application Ser. No. 13/685,871 filed on Nov. 27, 2012, (now U.S. Pat. No. 9,354,755), the entire contents of each of which are hereby incorporated herein by reference.

TECHNICAL FIELD

Certain example embodiments relate to a projected capacitive touch panel, and/or a method of making the same. More particularly, certain example embodiments relate to a projected capacitive touch panel with a silver-inclusive transparent conducting layer(s), and/or a method of making the same.

BACKGROUND AND SUMMARY

A capacitive touch panel includes an insulator such as glass, coated with a conductive coating. As the human body is also an electrical conductor, touching the surface of the panel results in a distortion of the panel's electrostatic field, measurable as a change in capacitance. A transparent touch panel may be combined with a display such as a liquid crystal panel to form a touchscreen. A projected capacitive (PROCAP) touch panel allows finger or other touches to be sensed through a protective layer in front of the conductive coating. The protective layer increases durability, while the ability to sense touches through an insulator allows a user to operate the touch panel while wearing gloves or the like.

FIGS. 1(a) to 1(g) illustrate an example of a related art projected capacitive touch panel, e.g., see U.S. Pat. No. 8,138,425, the disclosure of which is hereby incorporated herein by reference.

Referring to FIG. 1(a), substrate 11, x-axis conductor 12 for rows, insulator 13, y-axis conductor 14 for columns, and conductive traces 15 are provided. Substrate 11 may be a transparent material such as glass. X-axis conductors 12 and y-axis conductors 14 may be a transparent conductive coating, typically indium tin oxide (ITO). Insulator 13 may be any insulating material (for example, silicon nitride), which inhibits conductivity between x-axis conductors 12 and y-axis conductors 14. Traces 15 provide electrical conductivity between each of the plurality of conductors and a signal processor (not shown).

Referring to FIG. 1(b), x-axis conductor 12 (e.g., ITO) is formed on substrate 11. The ITO is coated in a continuous layer on substrate 11 and then is subjected to a first photolithography process in order to pattern the ITO into x-axis conductors 12. FIG. 1(c) illustrates cross-section A-A' of FIG. 1(b), including x-axis conductor 12 formed on substrate 11. Referring to FIG. 1(d), insulator 13 is then formed on the substrate 11 over x-axis channel(s) of x-axis conductor 12. FIG. 1(e) illustrates cross-section B-B' of FIG. 1(d), including insulator 13 which is formed on substrate 11 and x-axis conductor 12. The insulator islands 13 shown in FIGS. 1(d)-(e) are formed by depositing a continuous layer of insulating material (e.g., silicon nitride) on the substrate 11 over the conductors 12, and then subjecting the insulating material to a second photolithography, etching, or other patterning process in order to pattern the insulating material into islands 13. Referring to FIG. 1(f), y-axis conductors 14 are then formed on the substrate over the insulator islands 13 and x-axis conductors. The ITO is coated on substrate 11 over 12, 13, and then is subjected to a third photolithography or other patterning process in order to pattern the ITO into y-axis conductors 14. While most of y-axis conductor material 14 is formed directly on substrate 11, the y-axis channel is formed on insulator 13 to inhibit conductivity between x-axis conductors 12 and y-axis conductors 14. FIG. 1(g) illustrates cross-section C-C' of FIG. 1(f), including part of a y-axis conductor 14, which is formed on the substrate 11 over insulator island 13 and over an example x-axis conductor 12. It will be appreciated that the process of manufacturing the structure shown in FIGS. 1(a)-(g) requires three deposition steps and three photolithography type processes, which can render the process of manufacture burdensome, inefficient, and costly.

FIG. 1(h) illustrates another example of an intersection of x-axis conductor 12 and y-axis conductor 14 according to a related art projected capacitive touch panel. Referring to FIG. 1(h), an ITO layer is formed on the substrate 11 and can then be patterned into x-axis conductors 12 and y-axis conductors 14 in a first photolithography process. Then, an insulating layer is formed on the substrate and is patterned into insulator islands 13 in a second photolithography or etching process. Then, a metal conductive layer is formed on the substrate 11 over 12-14 and is patterned into conductive bridges 16 in a third photolithography process. Metal bridge 16 provides electrical conductivity for a y-axis conductor 14 over an x-axis conductor 12. Again, this process of manufacture requires three deposition steps and three different photolithography processes.

The projected capacitive touch panels illustrated in FIG. 1(a) through 1(h) may be mutual capacitive devices and self-capacitive devices.

In a mutual capacitive device, there is a capacitor at every intersection between an x-axis conductor 12 and a y-axis conductor 14 (or metal bridge 16). A voltage is applied to x-axis conductors 12, while the voltage of y-axis conductors 14 is measured (and/or vice versa). When a user brings a finger or conductive stylus close to the surface of the device, changes in the local electrostatic field reduce the mutual capacitance. The capacitance change at every individual point on the grid can be measured to accurately determine the touch location.

In a self-capacitive device, the x-axis conductors 12 and y-axis conductors 14 operate essentially independently. With self-capacitance, the capacitive load of a finger or the like is measured on each x-axis conductor 12 and y-axis conductor 14 by a current meter.

As shown in FIGS. 1(g) and 1(h), related art projected capacitive touch panels require at least three thin film layers (for example, an ITO layer(s), insulator, and another ITO layer or metal bridge) formed on substrate 11 in making the touch-sensitive structure, and possibly a further protective layer(s) thereover. And each thin film layer typically has its own photolithography and/or laser patterning process, which can increase production costs and/or time.

As described above, transparent conductors 12 and 14 are typically indium tin oxide (ITO), which is a costly material. Thin layers of ITO also have a high sheet resistance (at least about 100 ohms/square). In order for an ITO layer to have a sheet resistance less than 5 ohms/sq., the layer typically must be thick (for example, greater than 400 nm). A thick layer of ITO is both more costly and less transparent. Thus, the high sheet resistance of thin layers of ITO can limit its use in layouts requiring long narrow traces on large format touch panels (for example, panels with a diagonal measurement of more than 5 inches). It will be appreciated that there exists a need in the art to address one or more of the above-identified problems.

These and other limitations may be overcome by a projected capacitive touch panel with a silver-inclusive transparent conductive layer(s), where the silver-inclusive layer may be sandwiched between at least first and second dielectric layers. Certain example embodiments relate to designs that incorporate one or more low-emissivity (low-E), Ag-based coatings to create a large area transparent touch electrode (LATTE) that can handle multi-touch points. Mutual capacitance and self-capacitance designs are disclosed herein. The low-E coatings described herein may be less than half as costly as their ITO counterparts, and they may offer a better resistivity/transmission tradeoff, making them more readily usable in large applications.

In certain example embodiments of this invention, there is provided a capacitive touch panel. First and second substrates (e.g., glass substrates) are substantially parallel and spaced apart from one another. At least one multi-layer transparent conductive coating is patterned into a plurality of electrodes and located between the first and second substrates. The at least one multi-layer transparent conductive coating includes at least one conductive layer comprising silver, a dielectric layer comprising zinc oxide under and directly contacting the conductive layer comprising silver, and a dielectric layer(s) comprising tin oxide or silicon nitride over the conductive layer comprising silver. Processing circuitry is electrically connected to the plurality of electrodes and configured to measure an aspect of the electrodes' capacitance. A laminate material is located between the first and second substrates.

Display assemblies including capacitive touch panels also are contemplated herein. In addition to the capacitive touch panel, a display assembly according to certain example embodiments may include a flat panel display device (e.g., an LCD device) connected thereto.

The silver-inclusive transparent conductive coating may include, in order moving away from the substrate that supports it: a first silicon-based layer, a first dielectric layer, a second dielectric layer split by a third dielectric layer so as to form first and second portions of the second dielectric layer, a silver layer over and directly contacting the second portion of the second dielectric layer, an upper contact layer comprising an oxide of nickel and/or chromium directly over and contacting the silver layer, a fourth dielectric layer, and a second silicon-based layer, wherein the third dielectric layer comprises either titanium oxide or tin oxide.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1A:
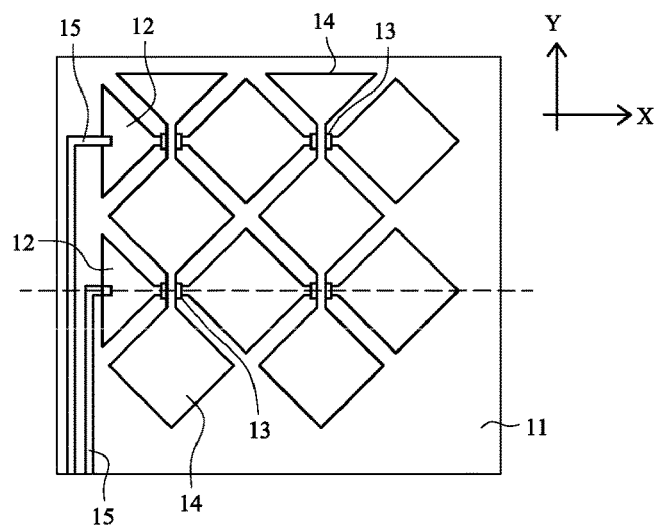
FIGS. 1(a) to 1(h) illustrate examples of related art projected capacitive touch panels.
Figure 1B:
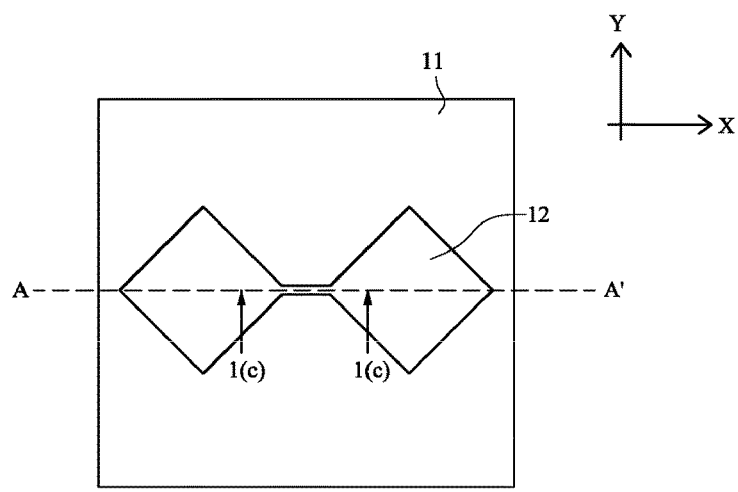
Figure 1C:
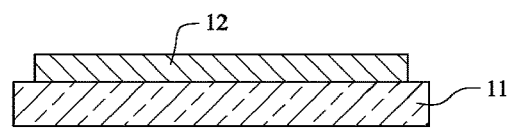
Figure 1D:
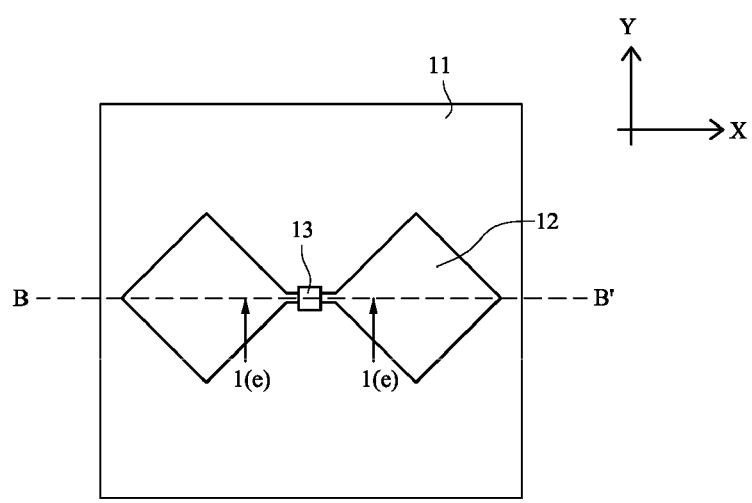
Figure 1E:
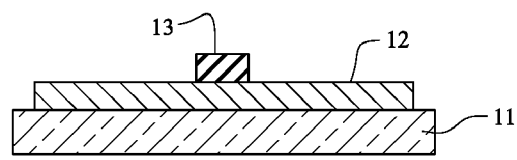
Figure 1F:
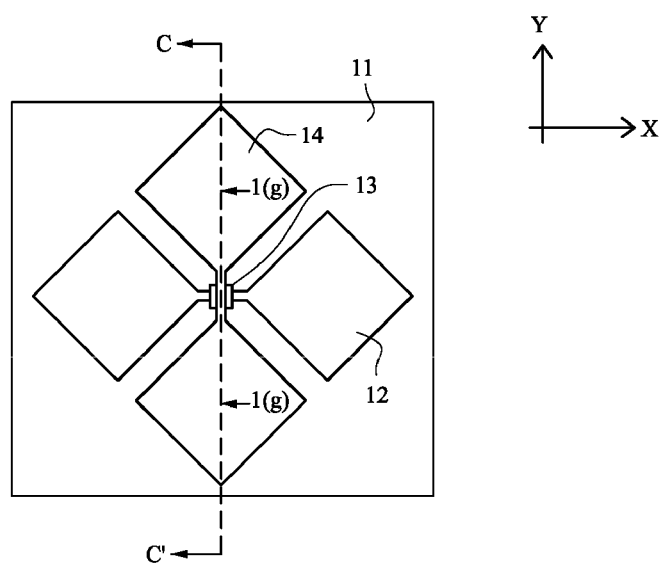
Figure 1G:
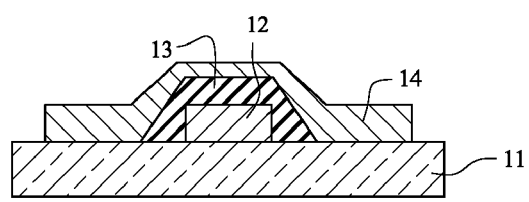
Figure 1H:
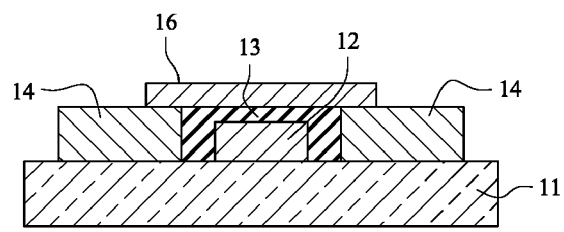

A detailed description of certain example embodiments is provided with reference to the accompanying drawings. Like reference numerals indicate like parts throughout the drawings.

Figure 2A:
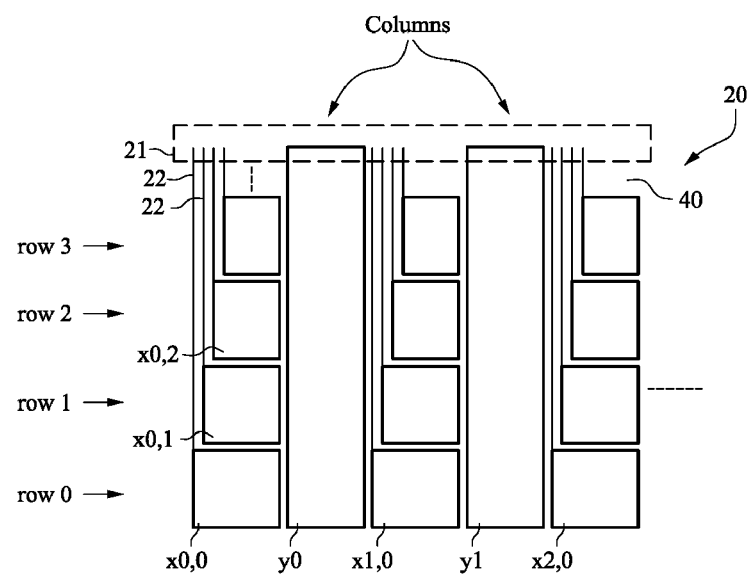
FIG. 2(a) illustrates a top or bottom plan layout of a projected capacitive touch panel according to an example embodiment.

FIG. 2(a) illustrates a top/bottom plan layout of a projected capacitive touch panel according to an example embodiment of this invention. Referring to FIG. 2(a), touch panel 20 is provided. Touch panel 20 includes a matrix of electrodes including n columns and m rows, provided on a substrate 40. The matrix of row/column electrodes is typically provided on the side of the substrate (e.g., glass substrate 40) that is opposite the side touched by person(s) using the touch panel. In other words, when the touch panel is touched by a finger, stylus, or the like, the substrate 40 is typically located between the finger and the matrix of row/column electrodes. A change in capacitance between adjacent row and column electrodes in the matrix as a result of the proximity of a finger or the like is sensed by the electronic circuitry, and the connected circuitry can thus detect where the panel is being touched by a finger or the like.

For example, referring to FIG. 2(a), row 0 includes row electrodes $x_{0,0}$, $x_{1,0}$, $x_{2,0}$, etc., through $x_{n,0}$ and columns 0, 1 and 2 respectively include column electrodes $y_0$, $y_1$, $y_2$, etc., through $y_n$. Optionally, the x electrodes in a column direction may also be grouped for column sensing. The number of row and column electrodes is determined by the size and resolution of the touch panel. In this example, the top-right row electrode is $x_{n,m}$.

Each row electrode $x_{0,0}$-$x_{n,m}$ of touch panel 20 is electrically connected to interconnect area 21 and corresponding processing circuitry/software by a conductive trace 22. Each column electrode $y_0$-$y_n$ is also electrically connected to interconnect area 21 and corresponding processing circuitry/software. The conductive traces 22 are preferably formed of the same transparent conductive material as the row and column electrodes (e.g., same material as at least row electrodes $x_{0,0}$, $x_{1,0}$, $x_{2,0}$, etc.). Thus, in certain example embodiments, the matrix of row and column electrodes and corresponding traces 22 can be formed on the substrate (e.g., glass substrate) 40 by forming a single coating (single or multi-layer coating) on the substrate and by performing only one (or maximum two) photolithography processes. In certain example embodiments, the silver-inclusive coating (e.g., see example coatings of FIGS. 4-6) is formed (e.g., sputter-deposited) on the substrate 40 and is then subjected to photolithography and/or laser patterning to pattern the silver-inclusive coating into traces 22, row electrodes $x_{0,0}$, $x_{1,0}$, $x_{2,0}$, $x_{0,1}$, $x_{0,2}$, $x_{0,3}$, etc., through $x_{n,m}$, and column electrodes $y_0$-$y_n$.

Because the row electrodes $x_{0,0}$-$x_{n,m}$, column electrodes $y_0$-$y_n$, and traces 22 do not overlap as viewed from above/below, the row electrodes $x_{0,0}$-$x_{n,m}$, column electrodes $y_0$-$y_n$, and traces 22 may be formed on the same plane parallel (or substantially parallel) to substrate 40 on which the electrodes and traces are formed. Significant portions of traces 22 may also be parallel (or substantially parallel) to the column electrodes in the plane parallel (or substantially parallel) to the substrate 40.

Accordingly, touch panel 20 may be made via a smaller number of photolithography or laser patterning steps while achieving traces that achieve sufficient transparency and conductivity, thereby reducing production costs and resulting in a more efficient touch panel for use in a display assembly or the like.

Figure 2B:
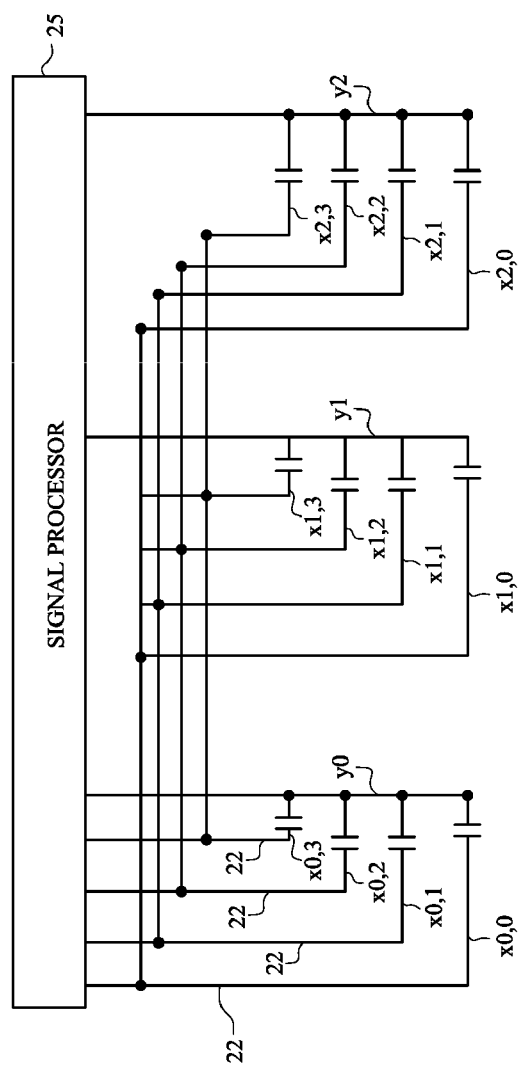
FIG. 2(b) illustrates a schematic representation of circuitry for the projected capacitive touch panel of FIG. 2(a) and/or 3.

FIG. 2(*b*) illustrates a schematic representation of circuitry for the touch panel 20 illustrated in FIG. 2(*a*), according to certain example embodiments. In touch panel 20, there is a capacitance between each row electrode and the adjacent column electrode (for example, between row electrode $x_{0,0}$ and column electrode $y_0$). This capacitance can be measured by applying a voltage to a column electrode (for example, column electrode $y_0$) and measuring the voltage of an adjacent row electrode (for example, row electrode $x_{0,0}$). When a user brings a finger or conductive stylus close to touch panel 20, changes in the local electrostatic field reduce the mutual capacitance. The capacitance change at individual points on the surface can be measured by measuring each pair of row electrodes and column electrodes in sequence.

The traces 22 of each row electrode in the same row (for example, the traces 22 of row electrodes $x_{0,0}$, $x_{1,0}$, $x_{2,0}$, etc., through $x_{n,0}$ of row 0) may be electrically connected together (as shown in FIG. 2(*b*)). The interconnection of the first row segments to each other, second row segments to each other, etc., may be made on a flexible circuit(s) attached at the periphery of the touch panel in the interconnection area, so that no cross-overs are needed on the glass. In that instance, a voltage is applied to a column electrode and the voltage of each row is measured in sequence before the process is repeated with a voltage applied to another column. Alternatively, each trace 22 may be connected to signal processor 25 and the voltage of each trace 22 may be measured individually.

The same capacitance may be measured by applying a voltage to a row electrode and measuring the voltage on an adjacent column electrode rather than applying a voltage to a column electrode and measuring the voltage of an adjacent row electrode.

Signal processing (for example, applying and measuring voltages, measuring the capacitance between adjacent electrodes, measuring changes in capacitance over time, outputting signals in response to user inputs, etc.) may be performed by signal processor 25. Signal processor 25 may be one or more hardware processors, may include volatile or non-volatile memory, and may include computer-readable instructions for executing the signal processing. Signal processor 25 is electrically connected to the column electrodes $y_0$-$y_n$ and electrically connected to the row electrodes $x_{0,0}$-$x_{n,m}$ through the traces 22. Signal processor 25 may or may not be located on the same plane as row electrodes $x_{0,0}$-$x_{n,m}$, column electrodes $y_0$-$y_n$, and traces 22 (for example, in interconnect area 21 of FIG. 2(*a*)).

Figure 3:
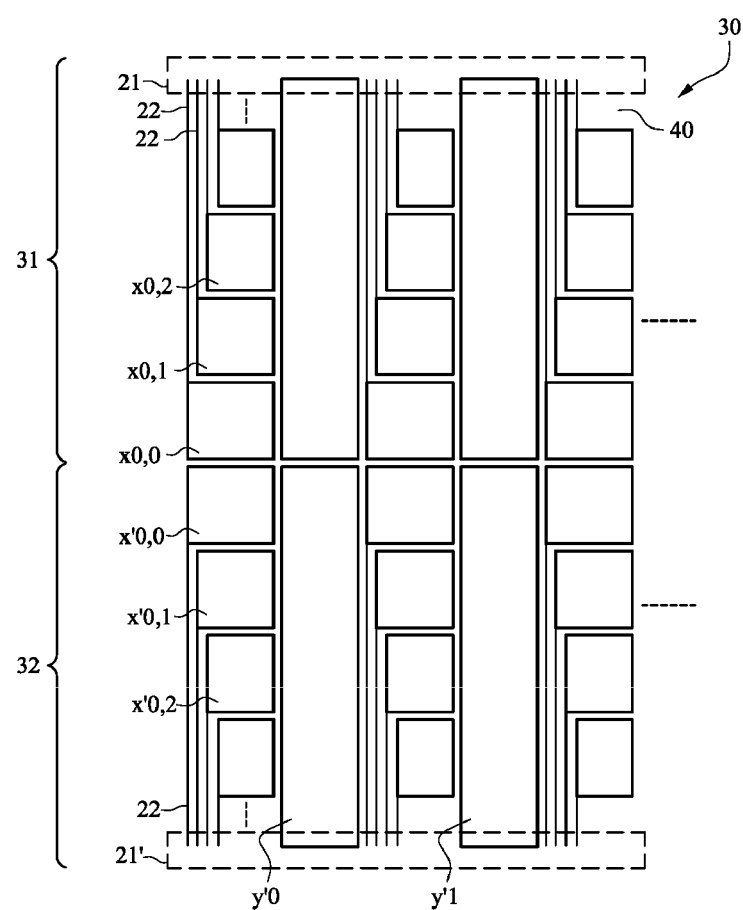
FIG. 3 illustrates a top or bottom plan layout of a projected capacitive touch panel according to another example embodiment.

FIG. 3 illustrates a layout of a projected capacitive touch panel according to other example embodiments. Referring to FIG. 3, touch panel 30 is similar to touch panel 20 of FIG. 2(*a*), except that touch panel 30 is divided into upper section 31 and lower section 32, each of which includes a matrix of electrodes including n columns and m rows. For example, row 0 of upper section 31 includes row electrodes $x_{0,0}$, $x_{1,0}$, $x_{2,0}$, etc., through $x_{n,0}$. Upper section 31 also includes column electrodes $y_0$, $y_1$, $y_2$, etc., through $y_n$. Likewise, lower section 32 would also include row electrodes, and column electrodes $y_0$-$y_n$ that may be electrically separate from the column electrodes $y_0$-$y_n$ of the upper section 31.

Thus, lower section 32 also includes a matrix of row electrodes including n columns and m rows, and n column electrodes. Lower section 32 may have more or less rows than upper section 31 in different example embodiments.

The number of row and column electrodes of touch panel 30 is determined by the size and resolution of the touch panel.

Each column electrode of upper section 31 is electrically connected to interconnect area 21, and each row electrode of upper section 31 is electrically connected to interconnect area 21 by a trace 22. As with the FIG. 2 embodiment, traces may or may not be used for connecting the column electrodes of upper section 31 to the interconnect area. Each column electrode of lower section 32 is electrically connected to interconnect area 21' and each row electrode of lower section 32 is electrically connected to interconnect area 21' by a trace 22. Again, traces may or may not be used for connecting the column electrodes of the lower section 32 to the interconnect area 21'.

Still referring to FIG. 3, touch panel 30 is similar to touch panel 20 in that there is a capacitance between each row electrode and the adjacent column electrode which may be measured by applying a voltage to a column electrode and measuring the voltage of an adjacent row electrode (or, alternatively, by applying a voltage to a row electrode and measuring the voltage of an adjacent column electrode). When a user brings a finger or conductive stylus close to touch panel 30, changes in the local electrostatic field reduce the mutual capacitance. The capacitance change at individual points on the surface can be measured by measuring the mutual capacitance of each pair of row electrodes and column electrodes in sequence.

Because the row electrodes and column electrodes illustrated in FIG. 3 do not overlap, the row electrodes and column electrodes may be formed on the same plane, in the manner explained above in connection with FIG. 2. Accordingly, electrode structure for the touch panel 30 may be thin in nature and may be patterned with one process (for example, one photolithography process or one laser patterning process), which can reduce the production cost of the projected capacitive touch panel.

As one of ordinary skill in the art will recognize, touch panels 20 and 30 described are not limited to the orientation described above and shown in FIGS. 2-3. In other words, the terms "row," "column," "x-axis," and y-axis" as used in this application are not meant to imply a specific direction. Touch panel 20 of FIG. 2(a), for example, may be modified or rotated such that interconnect area 21 is located in any part of touch panel 20.

As illustrated in FIGS. 2(a) and 3, narrow transparent conductive traces 22 are routed to electrically connect electrodes to interconnect area 21 (and interconnect area 21'). Because of the large resistance of the narrow ITO traces, narrow ITO traces may only been used in small touch panels, such as for smart phones. To use one of the layouts illustrated in FIGS. 2(a) and 3 on larger touch panels (for example, measuring more than 10 inches diagonally), a transparent conductive coating with low sheet resistance may be used. The silver inclusive coatings shown in FIGS. 4-6, for use in forming the row/column electrodes and traces 22, are advantageous in this respect because they have a much lower sheet resistance than typical conventional ITO traces.

Figure 4:
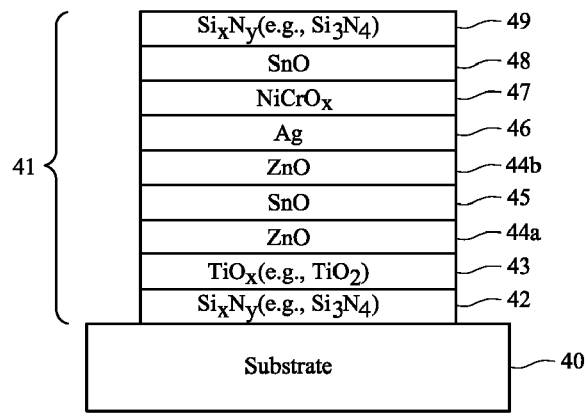
FIG. 4 illustrates a cross-sectional view of a silver-inclusive transparent conductive coating for a touch panel of FIGS. 2-3, according to certain example embodiments.
Figure 5:
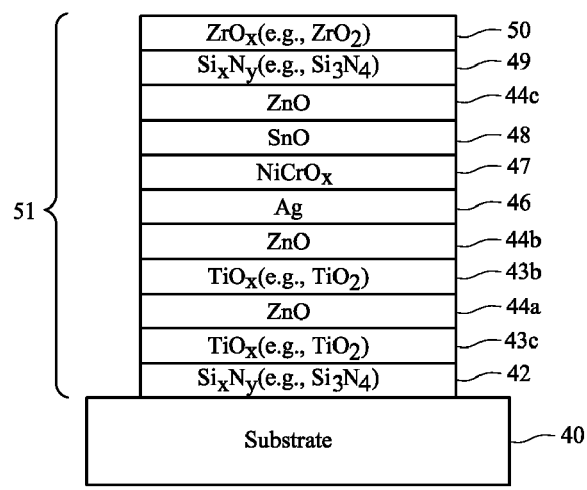
FIG. 5 illustrates a cross-sectional view of another example silver-inclusive transparent conductive coating for a touch panel of FIGS. 2-3.
Figure 6:
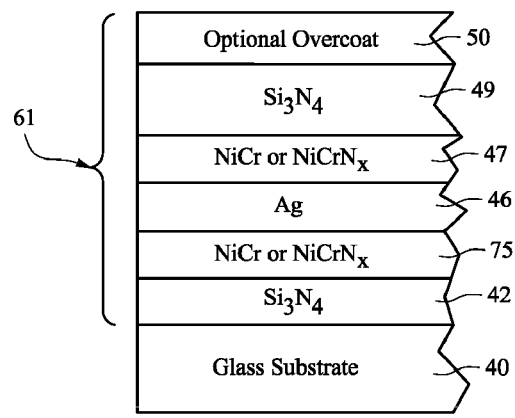
FIG. 6 illustrates a cross-sectional view of yet another example silver-inclusive transparent conductive coating for a touch panel of FIGS. 2-3.

Examples of silver-inclusive transparent conductive coatings (TCCs) with low sheet resistance, for forming row electrodes, column electrodes, and traces 22 are illustrated in FIGS. 4-6, according to certain example embodiments. In each of FIGS. 4-6, the low sheet resistance and high transparency of the TCC allow the TCC to form the long narrow traces 22 of the touch panels illustrated in FIGS. 2(a) and 3, as well as the row and column electrodes.

Referring to FIG. 4, coating (or layer system) 41 is provided, either directly or indirectly, on substrate 40. Substrate 40 may be, for example, glass. Coating 41 may include, for example, bottom dielectric silicon nitride based and/or inclusive layer 42 which may be $Si_3N_4$ (which may or may not be doped with other material(s) such as aluminum in certain example instances) or of the Si-rich type for haze reduction, or of any other suitable stoichiometry silicon nitride in different embodiments of this invention; a dielectric high index layer 43 of or including a material such as titanium oxide or niobium oxide, which may include titanium oxide (e.g., $TiO_2$ or other suitable stoichiometry); and first and second dielectric layers of or including zinc oxide 44a and 44b that may be split by a dielectric "glue" layer 45 of or including tin oxide; a silver-based conductive layer 46; an upper contact layer including nickel and/or chromium 47 which may be oxided and/or nitrided; a second layer of or including tin oxide 48; and an outer-most protective layer 49 of or including silicon nitride. The dielectric high index layer 43 may be fully oxidized or sub-stoichiometric in different example embodiments. The seed layer comprising zinc oxide 44b and the upper contact layer of or including nickel and/or chromium 47 directly contact the silver-based conductive layer 46.

While various thicknesses and materials may be used in layers in different embodiments of this invention, example thicknesses and materials for the respective sputter-deposited layers of coating 41 on the glass substrate 40 in the FIG. 4 embodiment are as follows, from the glass substrate outwardly:

TABLE 1

| Ref | Material | Preferred Thickness (Å) | More Preferred Thickness (Å) | Example Thickness 1 (Å) | Example Thickness 2 (Å) |
|---|---|---|---|---|---|
| 42 | $Si_xN_y$ | 1-500 | 100-300 | 160 | 160 |
| 43 | $TiO_x$ | 75-125 | 85-115 | 100 | 100 |
| 44a | ZnO | 35-75 | 40-70 | 60 | 50 |
| 45 | SnO | 35-200 | 50-135 | 100 | 70 |
| 44b | ZnO | 30-200 | 40-130 | 60 | 100 |
| 46 | Ag | 60-110 | 70-100 | 85 | 85 |
| 47 | NiCrOx | 20-40 | 23-37 | 30 | 30 |
| 48 | SnO | 150-275 | 170-255 | 220 | 200 |
| 49 | $Si_xN_y$ | 1-1000 | 100-500 | 220 | 250 |

In certain example embodiments, the layers 44a and 44b may have matching or substantially matching thicknesses. For instance, the thicknesses of these layers may differ by no more than 15% in certain example instances, no more than 10% in other example instances, and no more than 3-5% in yet other example instances. This is the case with Example 1 above, but is not the case with Example 2 above.

Referring to FIG. 5, another example transparent conductive coating (or layer system) 51 is provided, either directly or indirectly, on substrate 40. Substrate 40 may be, for example, glass. As with the FIG. 4 embodiment, FIG. 5 includes, for example, bottom dielectric silicon nitride based and/or inclusive layer 42 and a dielectric high index layer 43a, which may be of or include titanium oxide or niobium oxide (e.g., $TiO_2$ or other suitable stoichiometry). However, as shown in FIG. 5, the first and second dielectric layers comprising zinc oxide 44a and 44b (which may be doped with Al or the like) are split by a layer of or including titanium oxide (e.g., $TiO_2$ or other suitable stoichiometry) 43b. Another way of thinking about this is that the lower dielectric high index layer comprising titanium oxide 43 is split into two sub-layers (43a and 43b) by a first layer of or including zinc oxide 44a. An upper contact layer including nickel and/or chromium 47, which may be oxided and/or nitrided, a layer of or including tin oxide 48, a dielectric layer of or including zinc oxide 44c, and another dielectric silicon nitride based layer 49 may be provided above a conductive silver-based layer 46. A third zinc oxide inclusive layer 44c may be interposed between the layer comprising tin oxide 48 and the silicon nitride based layer 49. An optional zirconium oxide inclusive top coat 50 is shown as an outer-most layer (and thus above the silicon nitride based layer 49) in FIG. 5. This zirconium oxide inclusive top coat 50 may provide further durability improvements.

While various thicknesses and materials may be used in layers in different embodiments of this invention, example thicknesses and materials for the respective sputter-deposited layers on the substrate 40 in the FIG. 5 embodiment are as follows, from the substrate 40 outwardly:

TABLE 2

| Ref | Material | Preferred Thickness (Å) | More Preferred Thickness (Å) | Example Thickness 1 (Å) | Example Thickness 2 (Å) |
|---|---|---|---|---|---|
| 42 | $Si_xN_y$ | 1-500 | 10-300 | 156 | 156 |
| 43c | $TiO_x$ | 15-50 | 30-40 | 33 | 35 |
| 44a | ZnO | 70-200 | 95-125 | 114 | 110 |
| 43b | $TiO_x$ | 15-50 | 30-40 | 33 | 35 |
| 44b | ZnO | 70-200 | 95-125 | 114 | 110 |
| 46 | Ag | 70-120 | 80-100 | 90 | 90 |
| 47 | NiCrOx | 1-100 | 10-50 | 30 | 30 |
| 48 | SnO | 110-150 | 115-145 | 130 | 130 |
| 44c | ZnO | 70-200 | 95-125 | 109 | 109 |

TABLE 2-continued

| Ref | Material | Preferred Thickness (Å) | More Preferred Thickness (Å) | Example Thickness 1 (Å) | Example Thickness 2 (Å) |
|---|---|---|---|---|---|
| 49 | $Si_xN_y$ | 115-185 | 125-155 | 140 | 140 |
| 50 | $ZrO_x$ | 1-200 | 10-80 | 40 | 40 |

FIG. 6 illustrates another example transparent conductive coating that may be used to form the row and column electrodes, and traces 22, in FIGS. 2-3. The coating of FIG. 6 includes, from the glass substrate 40 outwardly, dielectric layer of or including silicon nitride, lower contact layer 75 of or including NiCr, NiCrOx, NiCrNx or the like, conductive layer 46 of or including silver, upper contact layer 47 of or including NiCr, NiCrOx, NiCrNx or the like, dielectric layer 49 of or including silicon nitride, and optional overcoat 50 of a material such as zirconium oxide.

A projected capacitive touch panel may be formed by using a silver-inclusive TCC (for example, coating 41 of FIG. 4, coating 51 of FIG. 5, or coating 61 of FIG. 6) patterned on a substrate 40 (for example, glass) in a layout to form the row electrodes $x_{0,0}$-$x_{n,m}$, column electrodes $y_0$-$y_n$, and traces 22 of touch panels 20 or 30 illustrated in FIGS. 2-3. Because the silver-inclusive TCC may be patterned with one photolithography process and/or laser patterning process, the overall cost of the projected capacitive panel is reduced.

Figure 7:
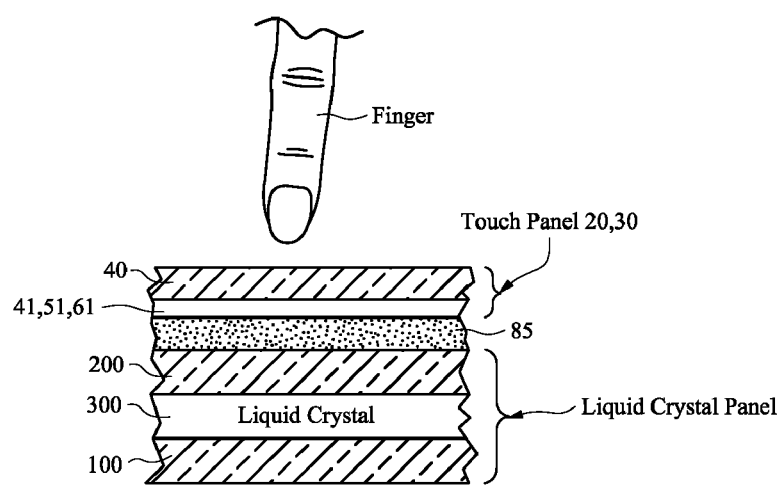
FIG. 7 is a cross-sectional view of a display assembly according to an example embodiment of this invention, including a touch panel according to any of FIGS. 2-6 coupled to a liquid crystal panel, for use in electronic devices such as portable phones, portable pads, computers, and/or so forth, in accordance with certain example embodiments.

Silver-inclusive TCCs 41, 51, 61 are inexpensive, have a low sheet resistance (preferably less than 15 ohms/square, more preferably less than about 10 or 5 ohms/square, with an example being approximately 4 ohms per square) and maintain high transmittance (preferably, greater than 70%, more preferably greater than about 80 percent). The TCC (41, 51 or 61) may be deposited on a major surface of the substrate 40 away from the user so as to reduce corrosive exposure to the atmosphere or contact with a finger or stylus. For example, the example display assembly shown in FIG. 7 includes a touch panel (20 or 30) mounted on a liquid crystal display panel. The row electrodes, column electrodes, and traces are form at 41, 51, 61 in FIG. 7 on the surface of the glass substrate 40 opposite the finger, and the touch panel (20, 30) may be adhered to the LCD panel via an index-matching adhesive layer 85. The LCD panel includes first and second substrates (e.g., glass substrates) 100, 200 with a liquid crystal layer 300 provided therebetween. In order to form a touchscreen, the touch panel 20, 30 may be mounted on the LCD panel with a small air gap (not shown), or bonded to the display with an index-matching adhesive 85.

The pixel pitch for projected capacitive touch panels may, for example, be in the range of from about 6 to 7 mm. Touch location can be determined more accurately, to about 1 mm, by signal processing and interpolation. If the line width/spacing for the traces 22 is approximately 10 µm to 20 µm, it can be calculated that a projected capacitive touch panel of at least 20 inches (measured diagonally) is possible for a TCC sheet resistance of about 4 ohms/square. Further optimization of the routing, signal processing and/or noise suppression allows for production of even larger touch panels (for example, greater than 40 or 50 inches diagonally).

As will be appreciated from the above, certain example embodiments may include one or more low-E Ag-based coatings in a large area transparent touch electrode (LATTE) that can accommodate multi-touch points. The low-E Ag-based coatings may be used in place of, or together with, ITO in certain example embodiments. Furthermore, mutual capacitance and self-capacitance designs are contemplated herein.

Figure 8:
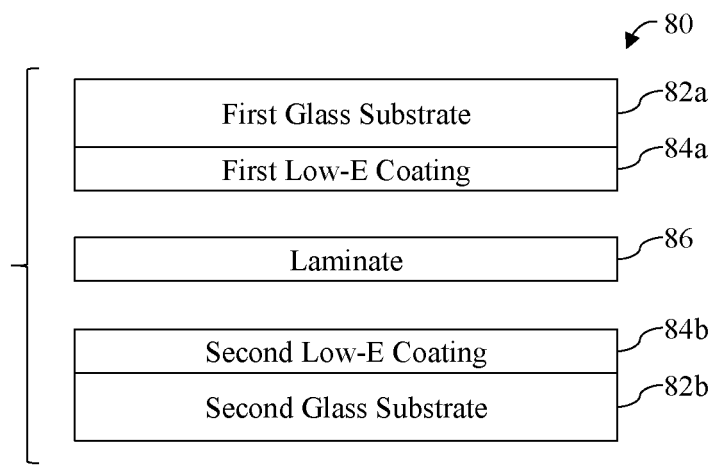
FIG. 8 is a cross-sectional view of a touch panel display subassembly using a self-capacitance design approach, in accordance with certain example embodiments.

As described above, a self-capacitance design approach generally is concerned with the capacitance of a single electrode to ground. Human body capacitance (or capacitance from a stylus or the like) increases the capacitance of the electrode to ground. In a self-capacitance sensor system, each electrode in an array may be measured individually, e.g., as rows and columns are scanned or the like. Self-capacitance design sensors may be used in connection with certain example embodiments. For example, FIG. 8 is a cross-sectional view of a touch panel display subassembly 80 using a self-capacitance design approach, in accordance with certain example embodiments. The FIG. 8 example subassembly 80 includes first and second glass substrates 82a and 82b respectively supporting first and second low-E Ag-based coatings 84a and 84b. The first and second low-E Ag-based coatings 84a and 84b are separate self-capacitance touch electrodes, with one measuring a first direction (e.g., the x-direction) and the other measuring a second direction (e.g., the y-direction). A laminate material 86 may be used to bond the first and second substrates 82a and 82b together, with the first and second low-E Ag-based coatings 84a and 84b being protected by virtue of being sandwiched between the first and second substrates 82a and 82b. The laminate material 86 may be a generally optically clear material such as, for example, PET, PVB, EVA, PU, and/or the like.

Figure 9:
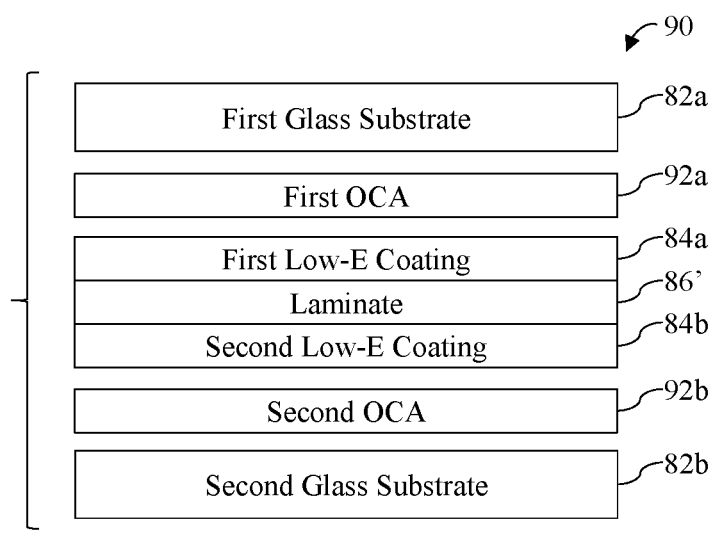
FIG. 9 is a cross-sectional view of a touch panel display subassembly using another self-capacitance design approach, in accordance with certain example embodiments.

FIG. 9 is a cross-sectional view of a touch panel display subassembly 90 using another self-capacitance design approach, in accordance with certain example embodiments. The FIG. 9 example subassembly 90 functions similarly to the FIG. 8 example subassembly 80. However, in this case, the laminate material 86' in the FIG. 9 example is shown supporting both of the first and second low-E Ag-based coatings 84a and 84b. The laminate material 86' may be pre-coated with the first and second low-E Ag-based coatings 84a and 84b. It may be received in a roll form, and rolled out in certain manufacturing methods, in order to orient the first and second low-E Ag-based coatings 84a and 84b towards the first and second substrates 82a and 82b. An optically clear adhesive (OCA) may be used to bond the subassembly 90 together. In this regard, first and second OCA materials 92a and 92b are shown as being interposed between the laminate material 86' and the first and second glass substrates 82a and 82b, respectively.

Figure 10:
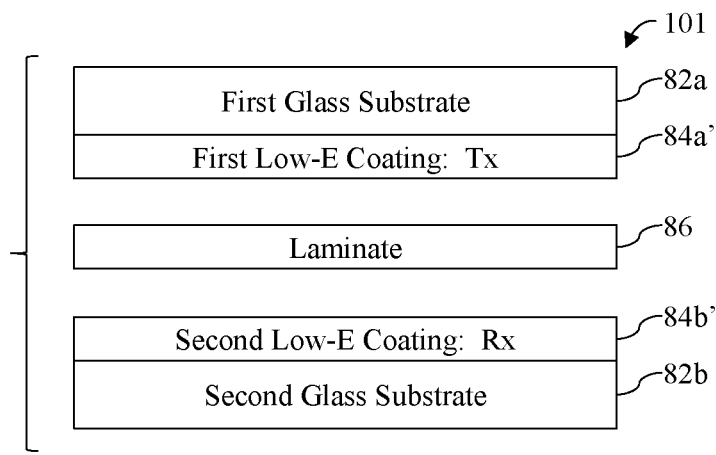
FIG. 10 is a cross-sectional view of a touch panel display subassembly using a mutual capacitance design approach, in accordance with certain example embodiments.

In a mutual capacitance sensor, capacitance is measured between two electrodes. One electrode functions as the drive or transmit electrode, and the other electrode functions as the sense or receive electrode. Human body capacitance (or stylus capacitance, etc.) "steals" the charge, which decreases the capacitance between the electrodes. In a mutual capacitance sensor system, each electrode intersection in an array of electrode pairings may be measured individually. Mutual capacitance design sensors also may be used in connection with certain example embodiments. For example, FIG. 10 is a cross-sectional view of a touch panel display subassembly 101 using a mutual capacitance design approach, in accordance with certain example embodiments. In the FIG. 10 example subassembly 101, the first low-E coating 84a' is used for transmission and the second low-E coating 84b' is used for receiving. It will be appreciated that the transmit and receive functionality may be reversed in certain example embodiments. Similar to the FIG. 8 example, the FIG. 10 example subassembly 101 has the first and second low-E coatings 84a' and 84b' supported by the first and second glass substrates 82*a* and 82*b*, respectively, with the subassembly 101 being bonded together via laminate material 86. The first and second low-E coatings 84*a*' and 84*b*' may be organized as rows and columns in two layers, in a "bar and stripe" configuration, etc.

Figure 11:
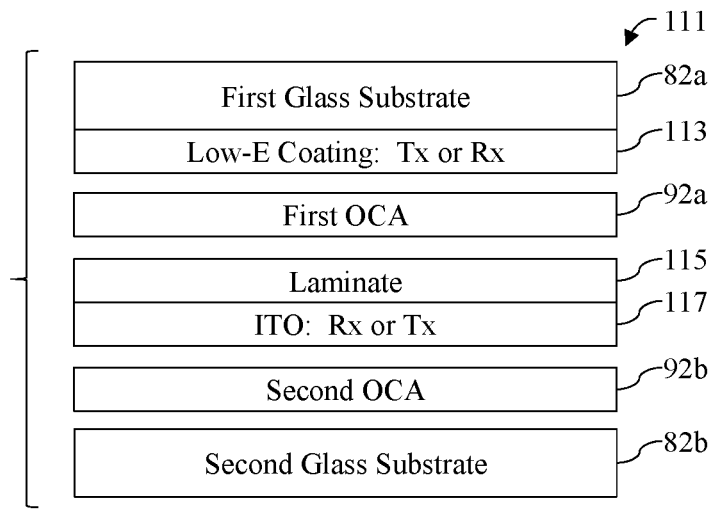
FIG. 11 is a cross-sectional view of a touch panel display subassembly using another mutual capacitance design approach, in accordance with certain example embodiments.

FIG. 11 is a cross-sectional view of a touch panel display subassembly 111 using another mutual capacitance design approach, in accordance with certain example embodiments. In the FIG. 11 example subassembly 111, the transmit and receive electrodes are of different types and are supported by different types of substrates. More particularly, in FIG. 11, the first glass substrate 82*a* supports a transmit or receive low-E coating 113, and the laminate material 115 supports the other type (receive or transmit) of electrode 117, which is shown as being of or including ITO. The laminate material 115 may be PET, PVB, EVA, PU, and/or the like. Similar to as noted above, it may be a rolled material supporting the ITO 117, and it may be unrolled prior to subassembly 111 being laminated together. First and second OCA materials 92*a* and 92*b* are shown as being interposed between the laminate material 115 and the first and second glass substrates 82*a* and 82*b*, respectively. Although the electrode 117 is shown as being of or include ITO, it will be appreciated that another material (such as, for example, a metal mesh, carbon nanotubes, carbon nanobuds, and/or the like) may be used instead of the ITO. It also will be appreciated that instead of the shown configuration, (1) the low-E coating 113 may be supported by the laminate material 115 and the other electrode 117 may be supported by the first glass substrate 82*a* as if they were reversed in the FIG. 11 example, (2) the low-E coating 113 may be supported by the second glass substrate 82*b* and other electrode 117 may be supported by the laminate material 115 on a side opposite the second glass substrate 82*b*, (3) other electrode 117 may be supported by the second glass substrate 82*b* and the low-E coating 113 may be supported by the laminate material 115 on a side opposite the second glass substrate 82*b*, etc.

Figure 12:
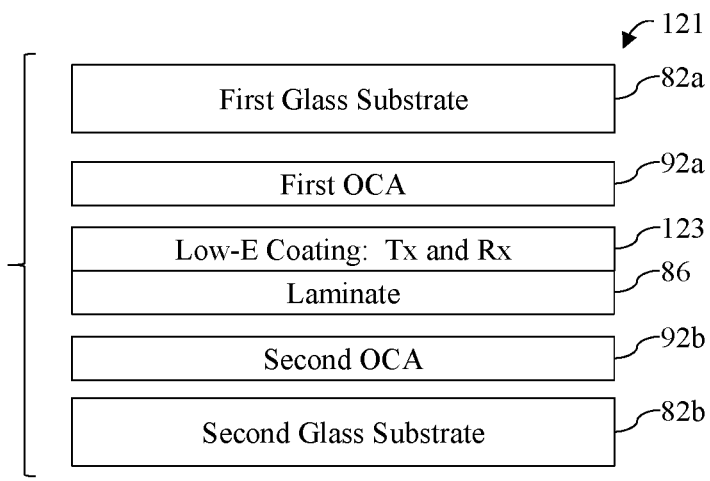
FIG. 12 is a cross-sectional view of a touch panel display subassembly using yet another mutual capacitance design approach, in accordance with certain example embodiments.

In addition to the possible configurations described above in connection with FIG. 10, a one layer arrangement may be used in certain example embodiments. This may include, for example, a configuration with an interlocking diamond pattern with bridges (e.g., similar to FIG. 1(*a*) or the like), in a caterpillar design (e.g., similar to FIG. 3 or the like), etc. This may be used in connection with a design arrangement similar to that shown in FIG. 7, or in FIG. 12. That is, both the FIG. 7 and the FIG. 12 examples may include a low-E coating that is patterned with a single layer mutual touch pattern, with the low-E coating being used for both transmit and receive functionality in a mutual capacitance design. In the FIG. 7 example, the substrate supporting the low-E coating is the glass substrate. In the FIG. 12 example, the low-E coating 123 may be supported by the laminate material 86. The FIG. 12 example subassembly 121 also includes first and second OCA materials 92*a* and 92*b* being interposed between the laminate material 86 and the first and second glass substrates 82*a* and 82*b*, respectively.

It will be appreciated that the low-E coatings discussed in connection with FIGS. 8-12 may be the same as, or similar to, the low-E coatings described above (e.g., in connection with FIGS. 4-6).

It will be appreciated that techniques used herein may be used in connection with glass, non-glass (e.g., plastic), or both glass and non-glass substrates. For instance, in certain example embodiments, in the case where one or both of the conductive coatings are on a plastic film or other non-glass substrate, there need not be a second glass substrate but instead the non-glass substrate may be directly bonded to the display.

It will be appreciated that the low-E Ag-based coatings used in large area transparent touch electrodes as described herein are advantageous over ITO-based electrodes and other technologies for a number of different reasons. For example, low-E Ag-based coatings as described herein tend to have a lower haze as compared to ITO-based coatings. The former typically will have haze less than 0.5%, more preferably less than 0.4% and sometimes as low as 0.25%. ITO, on the other hand, typically has a haze even when in a heat treated state of around 1%, and sometimes in the 0.75%-1% range. The reduction in haze is advantageous when it comes to providing higher resolution displays (e.g., as there currently is a move towards providing "4K resolution" products), and for facilitating readability in outdoor and sunny or high-light conditions. Reflection also tends to be lower for the low-E Ag-based coatings described herein, as compared to ITO-based coatings. The low-E Ag-based coatings described herein may have a reflection lower than 10%, more preferably lower than 7%, and typically around 5%. By contrast, ITO-based coatings typically have a reflection of about 10%.

In a somewhat related regard, low-E Ag-based coatings as described herein offer a better resistivity/transmission tradeoff as compared to ITO-based coatings. ITO-based coatings typically offer a resistance of about 100 ohms per square with 89-90% transmission after heat treatment, whereas low-E Ag-based coatings as described herein can achieve a resistance of less than 25 ohms per square, preferably less than 15 ohms per square, more preferably less than 10 ohms per square, still more preferably less than 10 ohms per square, and sometimes less than 7 ohms per square, with 88% transmission. The low-E Ag-based coatings as described herein preferably have a transmission of at least 80%, more preferably at least 85%, and still more preferably at least 87-88%. The move to low-E Ag-based coatings as described herein is advantageous in this respect as it provides for lower power consumption, faster touch response times (lower latency), and enables capacitive touch technology to be employed on larger displays. ITO-based sensors with these metrics typically can be used with a 40 inch maximum panel, whereas the example techniques described herein can be used in connection with 40 inch, 50 inch, 110 inch, or even greater sized panels (e.g., as measured by a diagonal of the panel). It will be appreciated that the transmission, sheet resistance, haze, reflection measurements apply when the low-E Ag-based coating is blanked coated onto a 3 mm thick clear soda-lime-silica glass, absent an antireflective coating.

In order to achieve the resistivity/transmission tradeoff noted above, ITO typically is thermally activated, post deposition, to increase the material's optical transmission and decrease its sheet resistance. The heat treatment process enables ITO-based coatings to improve their performance. Unfortunately, however, this introduces an extra processing step and limits the types of substrates to which they can be easily applied. By contrast, a low-E Ag-based coating may be formed using a room temperature coating process that does not necessarily require thermal activation. This opens the door to using different types of substrates (e.g., plastic substrates, PET, PVB, etc.), while providing significantly better optical and resistance properties as compared to non-heat treated ITO. In certain example embodiments, none of the touch panel substrates will be heat treated. In certain example embodiments, none of the touch panel substrates on which the low-E Ag-based coating is formed will be heat treated. On the other hand, in certain example embodiments, the low-E Ag-based coating of certain example embodiments may be heat treatable, which would allow large stock sheets to be coated, cut to size, and then heat treated (e.g., thermally tempered) with the coatings thereon, which can reduce manufacturing costs significantly.

ITO in general also is brittle, and the heat treatment can increase its brittleness. By contrast, low-E Ag-based coatings as described herein are more flexible and thus can be more easily incorporated into flexible, curved, and other types of displays.

ITO on PET is shipped in a non-heat treated condition on cylindrical rolls and may be heat treated when it is received by a customer to compensate for the rigidity of heat treated ITO. But because low-E, Ag-based coatings of the type described herein do not necessarily need to be thermally activated to achieve a good resistivity/transmission tradeoff, a customer can use a low-E Ag-based coating on PET/PVB directly off a roll without heat treating in some instances.

It will be appreciated that the technology disclosed herein may be used in connection with a wide variety of applications including, for example, electronic displays, vending machines, mirrors, storefronts, office walls, etc.

It will be appreciated that certain self-capacitance designs may be thought of as being "dual self-capacitance designs," e.g., in the sense that there may be two self-capacitance sensors (e.g., one on surface 2 and one on surface 3), with the surface 2 sensor measuring X position and the surface 3 sensor measuring Y position, or the like. It also will be appreciated that although certain example sensor configurations have been described in detail, other sensor configurations may be used in connection with the technology disclosed herein. See, for example, Geoff Walker's "Fundamentals of Projected-Capacitive Touch Technology" presentation, version 1.2, for SID Display Week 2014, dated Jun. 1, 2014, the entire contents of which are hereby incorporated herein by reference.

In certain example embodiments, glass substrate 40 with coating 41, 51, 61 thereon may be heat treated (e.g., thermally tempered), e.g., after coating, or chemically strengthened before coating. In general, the substrates described herein may be heat treated (e.g., heat strengthened and/or thermally tempered), and/or chemically tempered, in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Although an element, layer, layer system, coating, or the like, may be said to be "on" or "supported by" a substrate, layer, layer system, coating, or the like, other layers and/or materials may be provided therebetween.

In certain example embodiments, a capacitive touch panel is provided. First and second substrates (e.g., glass substrates) are substantially parallel and spaced apart from one another. At least one multi-layer transparent conductive coating is patterned into a plurality of electrodes and located between the first and second substrates, with the at least one multi-layer transparent conductive coating including at least one conductive layer comprising silver, a dielectric layer comprising zinc oxide under and directly contacting the conductive layer comprising silver, and a dielectric layer(s) comprising tin oxide or silicon nitride over the conductive layer comprising silver. Processing circuitry is electrically connected to the plurality of electrodes and configured to measure an aspect of the electrodes' capacitance. A laminate material is located between the first and second substrates.

In addition to the features of the previous paragraph, in certain example embodiments, the at least one transparent conductive coating may comprise: a first dielectric layer comprising silicon nitride; the dielectric layer comprising zinc oxide; the conductive layer comprising silver; an upper contact layer over and contacting the conductive layer comprising silver; and a second dielectric layer comprising silicon nitride.

In addition to the features of the previous paragraph, in certain example embodiments, the at least one transparent conductive coating may further comprise a dielectric layer comprising titanium oxide located between at least the first dielectric layer comprising silicon nitride and the dielectric layer comprising zinc oxide.

In addition to the features of either of the two previous paragraphs, in certain example embodiments, the at least one transparent conductive coating may further comprise, between at least the first dielectric layer comprising silicon nitride and the dielectric layer comprising zinc oxide, a layer comprising titanium oxide, another layer comprising zinc oxide, and a layer comprising tin oxide; and/or the at least one transparent conductive coating may further comprise, between at least the first dielectric layer comprising silicon nitride and the dielectric layer comprising zinc oxide, a layer comprising titanium oxide, another dielectric layer comprising zinc oxide, and another layer comprising titanium oxide.

In addition to the features of any of the four previous paragraphs, in certain example embodiments, the at least one transparent conductive coating may further comprise an overcoat comprising zirconium oxide.

In addition to the features of any of the five previous paragraphs, in certain example embodiments, first and second transparent conductive coatings may be respectively supported by the first and second substrates on major surfaces of the first and second substrates that face one another, with the first and second transparent conductive coatings being patterned into first and second sets of electrodes respectively, and with the laminate material laminating the first and second substrates together with the first and second transparent conductive coatings located between the first and second substrates. In such cases, in certain example embodiments, the capacitive touch panel may be configured for use as a self-capacitance touch panel and/or for use as a mutual capacitance touch panel, e.g., where the first set of electrodes comprises transmit electrodes and the second set of electrodes comprises receive electrodes. In a related regard, in addition to the features of any of the five previous paragraphs, in certain example embodiments, first and second transparent conductive coatings may be respectively supported by opposing major surfaces of the laminate material, with the first and second transparent conductive coatings being patterned into first and second sets of electrodes respectively, and with the capacitive touch panel being configured for use as a self-capacitance touch panel. In such cases, in certain example embodiments, an optically clear adhesive may bond together the first and second substrates with the first and second transparent conductive coatings located between the first and second substrates. In a related regard, in addition to the features of any of the five previous paragraphs, in certain example embodiments, a conductive layer, different from the at least one transparent conductive coating, may be supported by a major surface of the laminate material, and the at least one transparent conductive coating may be supported by a major surface of the first substrate that faces the second substrate, with the capacitive touch panel being configured for use as a mutual capacitance touch panel. In such cases, in certain example embodiments, the conductive layer that is different from the at least one transparent conductive coating may be supported by the major surface of the laminate material that faces the second substrate; and/or an optically clear adhesive may bond together the first and second substrates with the laminate material therebetween; and/or the conductive layer that is different from the at least one transparent conductive coating may comprise ITO. In a related regard, in addition to the features of any of the five previous paragraphs, in certain example embodiments, there may be one transparent conductive coating, which is supported by the first substrate on a major surface thereof that faces the second substrate, with the one transparent conductive coating being patterned into first and second sets of electrodes that are in substantially the same plane, and with the capacitive touch panel being configured for use as a mutual capacitance touch panel in which the first set of electrodes function as transmit electrodes and the second set of electrodes function as receive electrodes. In a related regard, in addition to the features of any of the five previous paragraphs, in certain example embodiments, there may be one transparent conductive coating, which is supported by the laminate material on a major surface thereof, with the one transparent conductive coating being patterned into first and second sets of electrodes that are in substantially the same plane, and with the capacitive touch panel being configured for use as a mutual capacitance touch panel in which the first set of electrodes function as transmit electrodes and the second set of electrodes function as receive electrodes. In such cases, in certain example embodiments, an optically clear adhesive may bond together the first and second substrates with the laminate material therebetween.

In addition to the features of any of the six previous paragraphs, in certain example embodiments, the at least one multi-layer transparent conductive coating, when blanket deposited, may have a visible transmission of at least 88% and/or a sheet resistance of no more than 10 ohms per square.

In addition to the features of any of the seven previous paragraphs, in certain example embodiments, the at least one multi-layer transparent conductive coating, when blanket deposited, may have a haze of no more than 0.5%.

In addition to the features of any of the eight previous paragraphs, in certain example embodiments, the at least one multi-layer transparent conductive coating may be room-temperature deposited and/or may be not heat treated.

In certain example embodiments, a display assembly including a flat panel display device is provided. A capacitive touch panel is connected to the flat panel display device. The capacitive touch panel comprises: first and second substrates (e.g., glass substrates) that are substantially parallel and spaced apart from one another; at least one multi-layer transparent conductive coating patterned into a plurality of electrodes and located between the first and second substrates, the at least one multi-layer transparent conductive coating including at least one conductive layer comprising silver, a dielectric layer comprising zinc oxide under and directly contacting the conductive layer comprising silver, and a dielectric layer(s) comprising tin oxide or silicon nitride over the conductive layer comprising silver; processing circuitry electrically connected to the plurality of electrodes and configured to measure an aspect of the electrodes' capacitance; and a laminate material located between the first and second substrates.

In addition to the features of the previous paragraph, in certain example embodiments, the flat panel display device may be an LCD device.

In addition to the features of either of the two previous paragraphs, in certain example embodiments, the capacitive touch panel may have a diagonal of at least 50 inches.

In addition to the features of any of the three previous paragraphs, in certain example embodiments, the at least one multi-layer transparent conductive coating, when blanket deposited, may have a visible transmission of at least 88%, a sheet resistances of no more than 10 ohms per square, and/or a haze of no more than 0.5%.

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A capacitive touch panel, comprising:
   first and second substrates that are spaced apart from one another;
   at least one multi-layer transparent conductive coating patterned into a plurality of electrodes and located between the first and second substrates, the at least one multi-layer transparent conductive coating including at least one conductive layer comprising silver, a dielectric layer comprising zinc oxide under and directly contacting the conductive layer comprising silver, and a dielectric layer comprising silicon nitride over the conductive layer comprising silver;
   processing circuitry electrically connected to the plurality of electrodes and configured to measure an aspect of capacitance; and
   a laminate material located between the first and second substrates.

2. The capacitive touch panel of claim 1, wherein the at least one transparent conductive coating comprises:
   a first dielectric layer comprising silicon nitride;
   the dielectric layer comprising zinc oxide;
   the conductive layer comprising silver;
   an upper contact layer over and contacting the conductive layer comprising silver; and
   a second dielectric layer comprising the silicon nitride.

3. The capacitive touch panel of claim 2, wherein the at least one transparent conductive coating further comprises a dielectric layer comprising titanium oxide located between at least the first dielectric layer comprising silicon nitride and the dielectric layer comprising zinc oxide.

4. The capacitive touch panel of claim 1, wherein the at least one transparent conductive coating further comprises an overcoat comprising zirconium oxide.

5. The capacitive touch panel of claim 1, further comprising:
   a conductive layer, different from the at least one transparent conductive coating, supported by a major surface of the laminate material that faces the second substrate;
   wherein the at least one transparent conductive coating is supported by a major surface of the first substrate that faces the second substrate, the capacitive touch panel being configured for use as a mutual capacitance touch panel.

6. The capacitive touch panel of claim 5, wherein the conductive layer that is different from the at least one transparent conductive coating comprises ITO.

7. The capacitive touch panel of claim 1, wherein the first and second substrates are glass substrates.

8. The capacitive touch panel of claim 1, wherein the at least one multi-layer transparent conductive coating, when blanket deposited, has a visible transmission of at least 88% and a sheet resistance of no more than 10 ohms per square.

9. The capacitive touch panel of claim 8, wherein the at least one multi-layer transparent conductive coating, when blanket deposited, has a haze of no more than 0.5%.

10. A capacitive touch panel, comprising:
  first and second substrates that are spaced apart from one another;
  at least one multi-layer transparent conductive coating patterned into a plurality of electrodes and a plurality of conductive traces and located between the first and second substrates, the at least one multi-layer transparent conductive coating including at least one conductive layer comprising silver, a dielectric layer comprising zinc oxide under and directly contacting the conductive layer comprising silver, and a dielectric layer comprising tin oxide over the conductive layer comprising silver;
  processing circuitry electrically connected to the plurality of electrodes and the plurality of traces, wherein the processing circuitry is configured to measure an aspect of capacitance; and
  a laminate material located between the first and second substrates.

11. The capacitive touch panel of claim 10, wherein the at least one multi-layer transparent conductive coating, when blanket deposited, has a visible transmission of at least 88% and a sheet resistance of no more than 10 ohms per square.

12. The capacitive touch panel of claim 10, wherein the at least one multi-layer transparent conductive coating, when blanket deposited, has a haze of no more than 0.5%.

13. The capacitive touch panel of claim 10, wherein the at least one multi-layer transparent conductive coating further comprising a layer comprising Ni and Cr located over and directly contacting the conductive layer comprising silver.

* * * * *